United States Patent

Nishikawa et al.

[11] Patent Number: 5,245,348
[45] Date of Patent: Sep. 14, 1993

[54] TRACKING ANTENNA SYSTEM

[75] Inventors: Kunitoshi Nishikawa, Gifu; Shigeki Ohshima; Toshiaki Watanabe, both of Aichi, all of Japan

[73] Assignee: Kabushiki Kaisha Toyota Chuo Kenkyusho, Aichi, Japan

[21] Appl. No.: 842,968

[22] Filed: Feb. 28, 1992

[30] Foreign Application Priority Data

Feb. 28, 1991 [JP] Japan ................................. 3-34045

[51] Int. Cl.$^5$ .............................. G01S 3/14; H01Q 3/02
[52] U.S. Cl. .................................... 342/359; 342/75; 342/77; 342/424; 342/449
[58] Field of Search ............... 342/74, 75, 77, 78, 342/79, 80, 81, 359, 423, 424, 426, 427, 430, 449

[56] References Cited

U.S. PATENT DOCUMENTS

| | | | |
|---|---|---|---|
| 4,499,472 | 2/1985 | Willett | 342/374 |
| 4,994,812 | 2/1991 | Uematsu et al. | 342/359 |
| 5,073,783 | 12/1991 | Uematsu et al. | 342/359 |
| 5,089,824 | 2/1992 | Uematsu et al. | 342/359 |

FOREIGN PATENT DOCUMENTS 1-261005 10/1989 Japan .
1-303903 12/1989 Japan .
1-304509 12/1989 Japan .
2-198204 8/1990 Japan .

*Primary Examiner*—John B. Sotomayor
*Attorney, Agent, or Firm*—Oblon, Spivak, McClelland, Maier & Neustadt

[57] ABSTRACT

An antenna is divided into a plurality of sub-arrays which are arranged parallel to each other on a turntable. At least one of the sub-arrays is laterally divided into sub-array sections. Reception signals from these sub-array sections are compared with each other to detect a phase difference therebetween. This phase difference is utilized to control the beam direction of the antenna such that the antenna can be properly oriented to the satellite at all times.

9 Claims, 11 Drawing Sheets

TRACKING ANTENNA SYSTEM

BACKGROUND OF THE INVENTION

1. Field of the Invention

The present invention relates to an on-board tracking antenna system in vehicles such as motorcars and the like, which is adapted to automatically direct an antenna beam to a broadcasting satellite and a communications satellite.

2. Description of the Related Art

Recently, the demand for satellite communications and satellite broadcasting has been increased due to their advantages such as wide area coverage and excellent picture quality. Further, satellite broadcasting and communications have been more and more utilized not only in houses but also in moving vehicles.

Such satellite communication or broadcasting requires that the antenna on the vehicle is always directed toward the satellite in order to maintain a desired sensitivity of reception as the vehicle moves. Since the vehicle will freely change its direction while in motion, the antenna must be rotated to all the azimuth directions, that is, through 360 degrees.

A prior art tracking antenna system for controlling the direction at the antenna to be towards the communications or broadcasting satellite is shown in FIG. 11. The tracking antenna system comprises a turntable 10 and a planar antenna 12 with an elevation drive device 14 mounted on the turntable 10. The turntable 10 itself is rotationally driven by an azimuth drive device 16. The tracking antenna can be mounted on the roof of a motorcar or the like and can always be directed towards the satellite through the actuations of the elevation and azimuth drive devices 14 and 16. In Japan, an elevation angle is frequently set to be in the range between about ±10 degrees and ±20 degrees relative to the direction of the satellite.

In order to track the satellite, the tracking antenna system must detect the satellite direction at all times. To this end, the prior art has always detected a signal level by continually changing the direction of the antenna gradually such that the maximum signal level will be obtained. In order to associate the automated tracking operation more accurately with the movement of the motorcar, a gyrocompass or geomagnetic sensor has been mounted in the motorcar to sense the orientation of the moving motorcar which is in turn combined with the information of the satellite to thus track the satellite.

However, the prior art tracking antenna necessarily requires an increased height to obtain a sufficient gain.

More particularly, a small-sized antenna may be an array antenna comprising a plurality of micro strip or slot antenna elements. On the other hand, the gain in such an antenna should be equal to or higher than about 30 dBi as in the reception of satellite broadcasting. Thus, such an antenna is required to have 300 to 500 micro strip or slot antenna elements which are arranged in the desired pattern. This results in an increase in the size of the antenna 12, which is a difficult problem to overcome.

When the beam direction of the antenna is continually changed to track the satellite, any unnecessary motion of the antenna may adversely affect the reception.

The present invention is directed to improve the detection of the satellite in the aforementioned tracking antenna system.

SUMMARY OF THE INVENTION

It is therefore an object of the present invention to provide an on-board tracking antenna system suitable for use in vehicles, which can track the satellite more easily and reliably and has a reduced height.

To this end, the present invention provides an on-board tracking antenna system comprising a plurality of antenna sub-arrays each including a plurality of antenna elements arranged in planes and adapted to output a reception signal. These antenna sub-arrays include a laterally divided sub-array consisting of two left and right-hand divided groups of antenna elements, each group being separately adapted to output a reception signal. The antenna sub-arrays, including the laterally divided sub-array, are disposed on the surface of a turntable with the planes in which the antenna elements are arranged being parallel to each other. The tracking antenna system also comprises a phase comparing and detecting circuit for receiving the reception signals from the respective groups of antenna elements in the laterally divided sub-array and for detecting any phase difference between the received signals. A rotary drive means, responsive to a detection signal from this phase comparing and detecting circuit, is provided to rotate and position the turntable. The received signals from the respective groups of antenna elements in the laterally divided sub-array are received and summed by an adder circuit. There is further provided a phase correcting and synthesizing circuit for receiving the outputs from the antenna sub-arrays, including the laterally divided sub-array, and for correcting their phases to produce a synthesized in-phase output signal.

The two signals from the laterally divided sub-array are received by the phase comparing and detecting circuit wherein a phase difference therebetween is detected. If the antenna element arrangement plane of the laterally divided sub-array is properly oriented to the satellite, there is no phase difference between the signals from the laterally divided sub-array. The phase difference depends on an angle included between a normal line of the element arrangement plane of the laterally divided sub-array and an imaginary line extending between the satellite and the antenna system (hereinafter called simply "the direction of satellite"). Therefore, the laterally divided sub-array can be properly oriented to the satellite by controlling the rotary drive means in response to the output of the phase comparing and detecting circuit.

In such an arrangement, the antenna system can follow the satellite through the operation of a very simplified mechanism to control the beam direction of the antenna system.

The turntable rotatably positioned by the rotary drive means includes the plurality of antenna sub-arrays arranged thereon such that the planes of antenna element arrangement will be parallel to each other. Therefore, all the beam directions of the sub-arrays on the turntable can be equalized to orient the beam direction of the entire antenna system to the satellite. Since a plurality of such divided sub-arrays are used, the height of each of the sub-arrays can be reduced, resulting in a reduction of the height of the entire antenna system.

The outputs of all the sub-arrays containing the laterally divided sub-array can be corrected in phase and synthesized into an output which has a sufficient gain. In addition, the reception signals from the two groups in the laterally divided sub-array can be summed to form an output signal, which can be used in tracking the satellite. Thus, the antenna system can track the satellite simply by utilizing a part of the antenna. This leads to simplification of the entire antenna structure.

The tracking antenna system of the present invention also comprises a vertically divided sub-array included in the sub-arrays and contains two upper and lower groups of antenna elements, each of the groups being separately adapted to output a reception signal. An elevation drive means is included for rotatably driving the sub-arrays, including the vertically divided sub-array, in the direction of elevation. An elevation drive phase comparing and detecting circuit receives the reception signals from the respective groups of antenna elements in the vertically divided antenna sub-array and detects a phase difference therebetween. An elevation control means responsive to the outputs of the elevation drive phase comparing and detecting circuit actuates the elevation drive means to rotate and position the sub-arrays.

By detecting the phase difference between the reception signals from the upper and lower antenna element groups in the vertically divided antenna sub-array and controlling the elevation drive means so that the phase difference will be equal to zero, the tracking antenna system can be controlled to be always oriented to the satellite with respect to its azimuth. The accuracy of tracking in the antenna system can be increased in accordance with the present invention.

DETAILED DESCRIPTION OF THE PREFERRED EMBODIMENTS

The present invention will now be described by way of example with reference to the drawings.

Entire Arrangement

Figure 1:
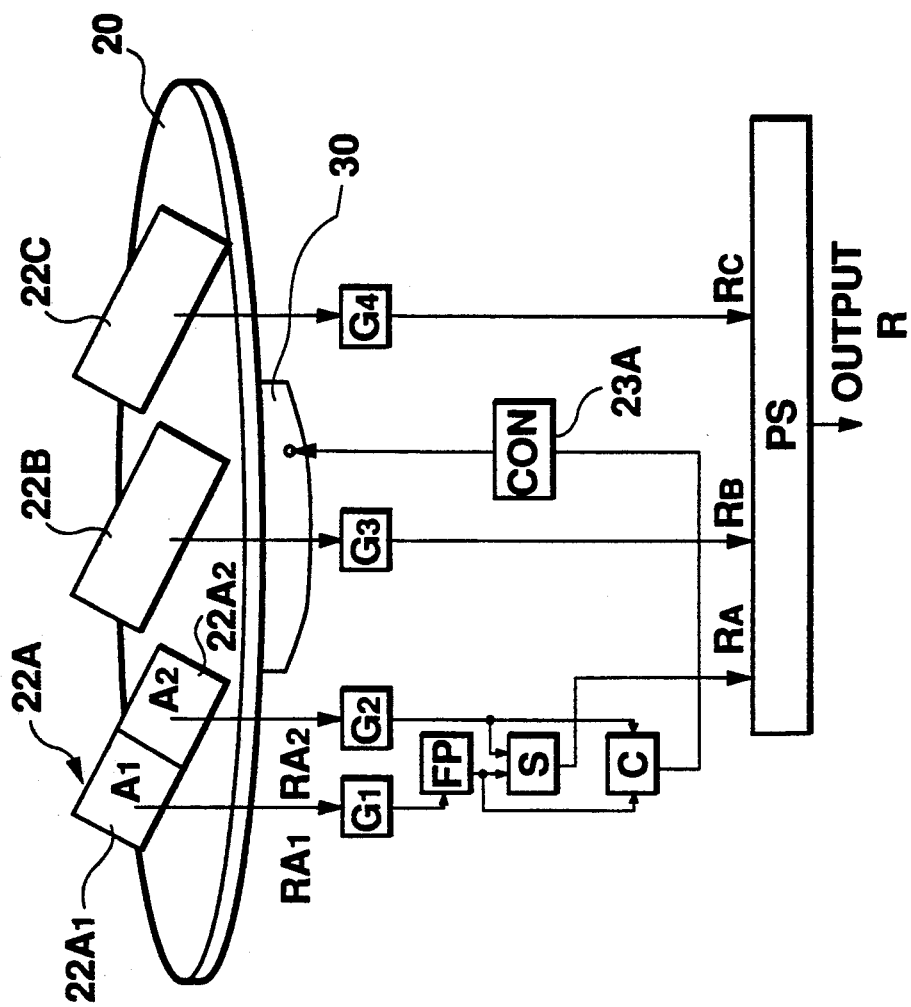
FIG. 1 is a schematic diagram of the entire arrangement of a tracking antenna system constructed in accordance with the present invention.

Referring first to FIG. 1, there is shown three sub-arrays 22A, 22B and 22C which are located on a turntable 20. The turntable 20 is rotationally positioned by an azimuth drive device 30 which is mounted on a vehicle, e.g. at its roof. Thus, the antenna may be rotated in the azimuth direction to track the satellite.

Figure 2:
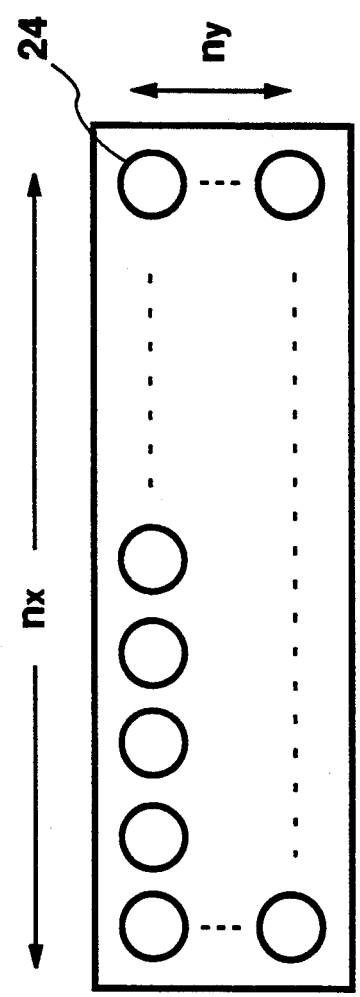
FIG. 2 is a view illustrating an arrangement of antenna elements defining a sub-array.

Each of the sub-arrays 22A–22C comprises a matrix of antenna elements 24 equidistantly arranged such that the number of antenna elements is equal to $n_x$ in the transverse direction and to $n_y$ in the longitudinal direction, as illustrated in FIG. 2.

In order to provide the gain equal to about 30 dBi, it is necessary for the total number of antenna elements to be equal to about 300–500. If the number of antenna elements 24 is the same throughout all the sub-arrays 22A, 22B and 22C, it can be proposed that the number of antenna elements 24 in one sub-array 22 is $n_x \times n_y = 16 \times 8 = 128$, the total number of antenna elements 24 in all the sub-arrays 22 being equal to 384. In order to reduce the height of the antenna to as low as is possible, it is desirable to increase the value $n_x$ as much as possible and to decrease the value $n_y$ as much as possible.

In this embodiment, the sub-array 22A is a laterally divided sub-array which comprises two laterally divided sub-array sections $22A_1$ and $22A_2$. For example, 128 antenna elements 24 are divided into two sub-array sections each having 64 antenna elements. Outputs from the respective antenna elements 24 in each sub-array section $22A_1$ or $22A_2$ are corrected in phase and synthesized into one output signal. As a result, the laterally divided sub-array 22A will have two outputs. In accordance with the present invention, the number of antenna elements in one sub-array section need not necessarily be equal to that of the other sub-array section but the difference between the numbers of antenna elements in the two sub-array sections should not be extremely large.

Reception signals from the sub-array sections $22A_1$ and $22A_2$ are inputted to a phase comparing and detecting circuit C after they have been amplified by amplifier circuits G1 and G2, respectively.

Figure 3:
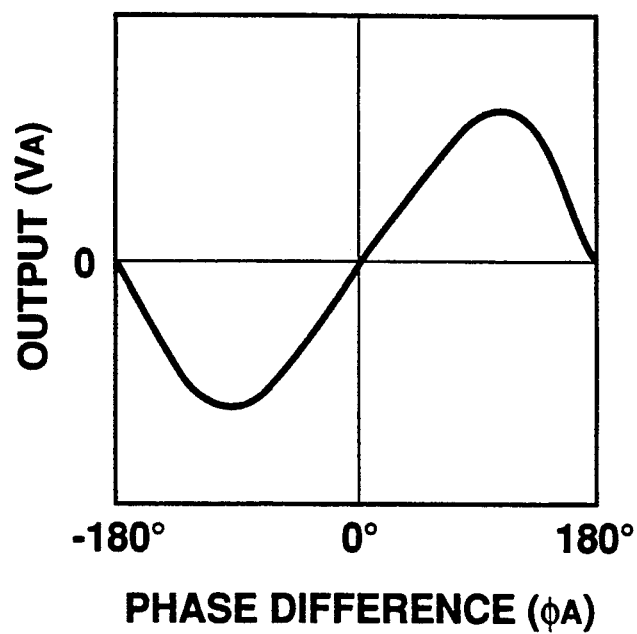
FIG. 3 is a graph illustrating the output characteristics of a phase comparing and detecting circuit.

The phase comparing and detecting circuit C compares the reception signals $R_{A1}$ and $R_{A2}$ from the two sub-array sections $22A_1$ and $22A_2$ and generates a DC output $V_A$ corresponding to a phase difference $\phi_A$ between these two reception signals, as shown in FIG. 3. The DC output signal is supplied to a drive control 23A which in turn outputs a drive signal, corresponding to the DC output $V_A$, to the azimuth drive device 30.

As seen from FIG. 3, there is a sine curvelike relationship between the phase difference $\phi_A$ and the output $V_A$. With the phase difference $\phi_A$ ranged between $-90$ degrees and $+90$ degrees, it can be simply determined depending on the output $V_A$. If the sub-array 22A is properly directed towards the satellite, the phase of the reception signal in one of the sub-array sections $22A_1$ or $22A_2$ must be perfectly identical with that of the other sub-array section. Therefore, it is believed that the phase difference $\phi_A$ represents a deviation in the azimuth. If the azimuth drive device 30 is so controlled that the output voltage $V_A$ becomes zero at all times, the sub-array 22A will always be oriented properly towards the communication satellite.

The azimuth drive device 30 preferably includes a servomotor. In such a case, the amount of rotation of the servomotor will be determined depending on the drive signal supplied from the drive control 23A to the servomotor.

The sub-arrays 22A, 22B and 22C are arranged on the turntable 20 such that the planes of the sub-arrays on which the antenna elements are disposed will be parallel to each other. Consequently, if the sub-array 22A is directed towards the satellite, all the remaining sub-arrays 22B and 22C will be also oriented towards the satellite.

If the phase difference exceeds ±90 degrees in this embodiment, it will be detected to compensate for the direction of the antenna. Since the sensitivity of reception is reduced to a level lower than a predetermined level if the phase difference exceeds ±90 degrees in this embodiment, this reduction can be detected to perform the compensation.

The output of the sub-array section $22A_1$ is inputted to an adding circuit S through the amplifier $G_1$ and a phase-adjusting circuit FP which has a fixed amount of phase shift. On the other hand, the output of the sub-array section $22A_2$ is inputted to the adding circuit through the amplifier $G_2$. In the adding circuit S, these signals are summed and synthesized into a signal which is the output RA of the entire sub-array 22A. In this case, the reception signals of the sub-array sections $22A_1$ and $22A_2$ are in-phase since the sub-array sections have the same azimuth and are always directed towards the satellite. Thus, this means that a doubled output can be provided simply by adding the two outputs.

However, there may be some differences in length between the cables leading to the adding circuit S depending on the manner of manufacture. In order to compensate for such a difference, the phase adjusting circuit FP is provided to adjust signals inputted into the adding circuit so that they are of the same phase. The phase-adjusting circuit FP is of a simple structure which can adjust the phase only by slightly increasing or decreasing the length of a cable which extends from the amplifier G1 to the adding circuit S. In such a manner, two signals inputted to the adding circuit S can be reliably adjusted to have substantially the same phase by the phase adjusting circuit FP.

The reception signals from the sub-arrays 22B and 22C are fed to a phase correcting and synthesizing circuit PS through amplifiers G3 and G4, respectively. The phase correcting and synthesizing circuit PS also receives the reception signal RA from the adding circuit S, which is the output of the sub-array 22A. The phase correcting and synthesizing circuit adjusts these three inputted signals $R_A$, $R_B$ and $R_C$ into the same phase and then sums them to form a composite reception output R. Thus, this composite reception output R is a sum of in-phase reception signals from all the antenna elements 24 in the sub-arrays 22A, 22B and 22C. In such a manner, the gain can be maintained at about 30 dBi.

Figure 4:
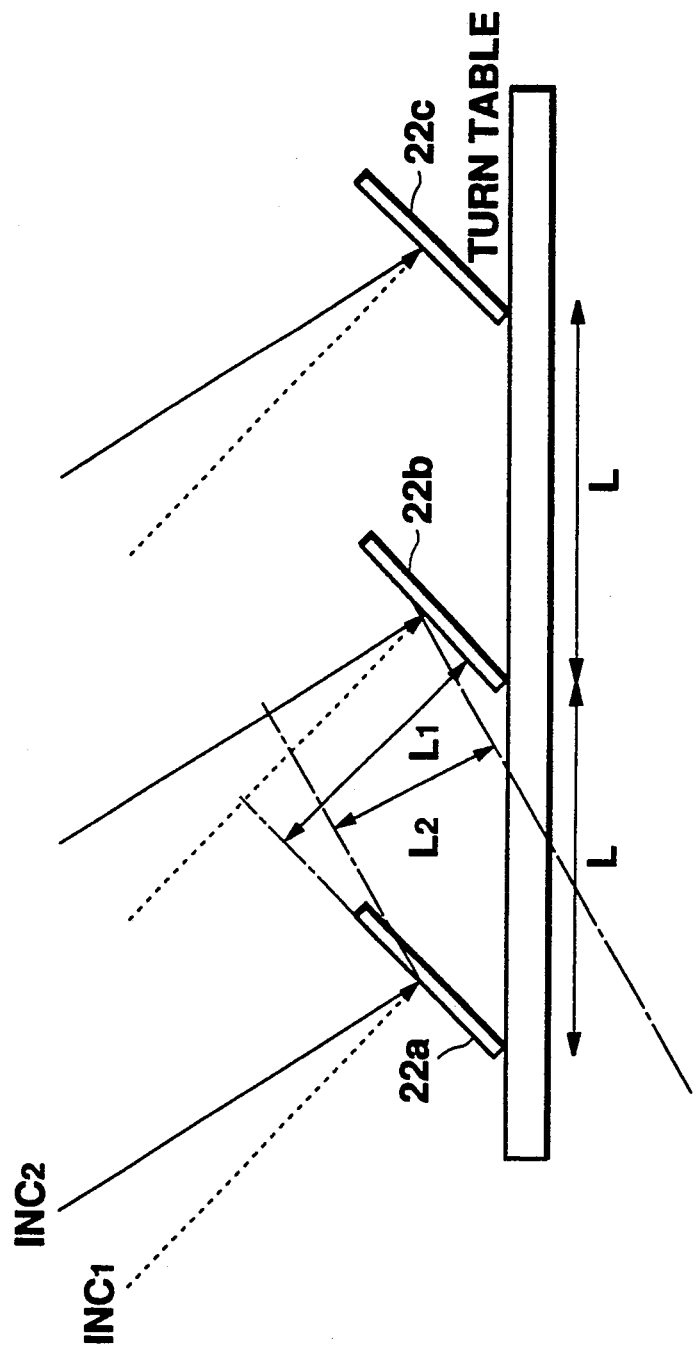
FIG. 4 is a view illustrating the relationship between the azimuth to the satellite and a difference in path.

The phase correcting and synthesizing circuit PS must compensate for the phases of the reception signals obtained by the respective sub-arrays 22A, 22B and 22C. As shown in FIG. 4, for example, if it is assumed that the spacing between adjacent sub-arrays is equal to L and the direction of satellite is INC1, a difference in path length between the sub-arrays 22A and 22B will be equal to $L_1$. As the vehicle moves, the angle of elevation at each of the sub-arrays 22 will be changed. When the direction of the satellite becomes INC2, the difference in path length between the sub-arrays 22A and 22B will be $L_2$. In such a manner, the phase difference of the reception signals in the sub-arrays 22A, 22B and 22C will be varied depending on variations of the elevation angle. By simply synthesizing the reception signals from the three sub-arrays 22A, 22B and 22C, they cannot be adjusted to be in-phase and synthesized such that a sufficient power of reception will be provided.

To avoid such a problem, this embodiment is adapted to detect the phase difference between the reception signals from the respective sub-arrays 22A, 22B and 22C. A phase shifter is responsive to the detected phase difference and corrects it such that all the signals having the same phase will be synthesized into a single output signal.

The phase correcting and synthesizing circuit PS has the following arrangement for correcting three inputs $R_A$, $R_B$ and $R_C$ into the same phase and for synthesizing them into a single signal.

First Example of Phase Correcting and Synthesizing Circuit PS

Figure 5:
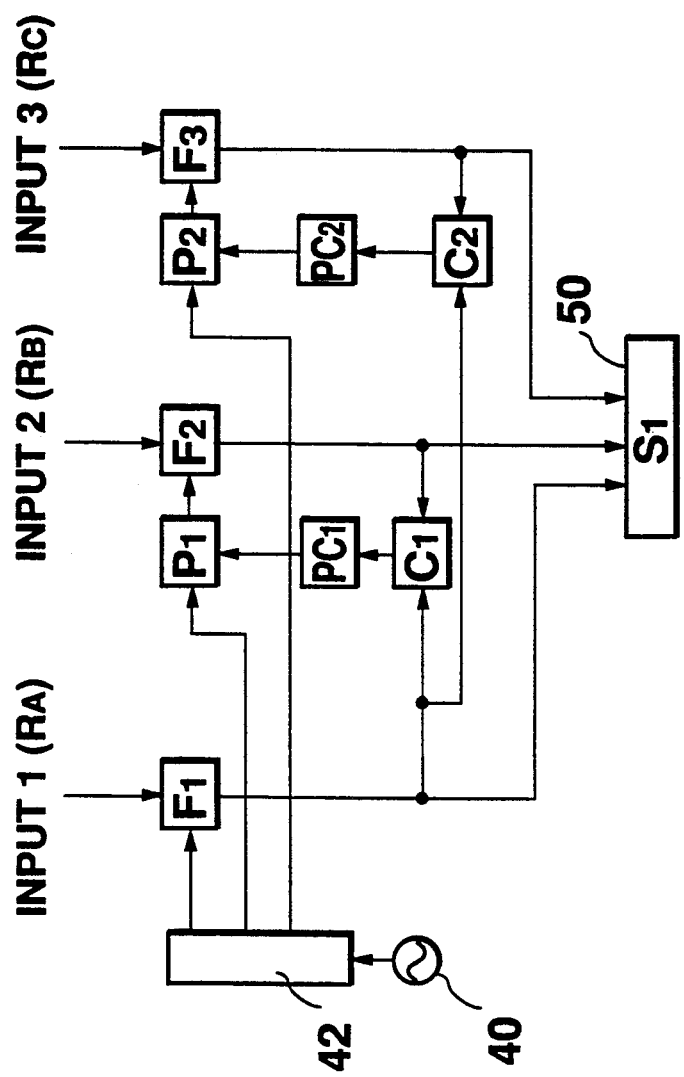
FIG. 5 is a block diagram of a phase correcting and synthesizing circuit.

Referring now to FIG. 5, there is shown a phase correcting and synthesizing circuit PS which is adapted to mix the reception signals from the sub-arrays 22 with a reference frequency signal from a local oscillator circuit 40 to form a predetermined low-frequency signal. On this frequency conversion, the phase of the signal from the local oscillator 40 is adjusted by a phase shifter, so that the phase of reception signals will be adjusted indirectly.

More particularly, the reception signals $R_A$, $R_B$ and $R_C$ from the sub-arrays 22 are inputted to frequency converting circuits $F_1$, $F_2$ and $F_3$, respectively. On the other hand, a signal having a given frequency which is outputted from the local oscillator 40 is also supplied to the respective frequency converting circuits $F_1$, $F_2$ and $F_3$ through a branching circuit 42.

In accordance with this embodiment, the output of the branching circuit 42 is directly inputted to the frequency converting circuit $F_1$. However, a phase shifter $P_1$ is located in an input line leading to the frequency converting circuit $F_2$ while another phase shifter $P_2$ is located in an input line leading to the frequency converting circuit $F_3$. Thus, the frequency converting circuits $F_1$, $F_2$ and $F_3$ will convert signals having different phases, depending on the amount of phase shift in the phase shifters $P_1$ and $P_2$.

The amount of phase shift in the phase shifter $P_1$ is controlled by an output signal from a phase shift calculating circuit $PC_1$ which is responsive to the output of the phase comparing and detecting circuit $C_1$. On the other hand, the amount of phase shift in the phase shifter $P_2$ is controlled by the output from a phase shift calculating circuit $PC_2$ which is responsive to the output of the phase comparing and detecting circuit $C_2$.

The phase comparing and detecting circuit $C_1$ generates an output signal corresponding to the phase difference between the outputs of the frequency converting circuits $F_1$ and $F_2$. The phase comparing and detecting circuit $C_2$ detects the phase difference between the outputs of the frequency converting circuits $F_1$ and $F_3$ and generates an output signal corresponding to such a phase difference. Thus, both the phase shift calculating circuits $PC_1$ and $PC_2$ will compare the output of the frequency converting circuit $F_1$, that is, the input $R_A$ with the output signals of the frequency converting circuits $F_2$ and $F_3$ to detect the phase differences therein. Since the phase shift calculating circuits $PC_1$ and $PC_2$ control the respective phase shifters $P_1$ and $P_2$ such that the phase differences will be equal to zero, the output signals of the frequency converting circuits $F_1$, $F_2$ and $F_3$ can be controlled to be in-phase at all times. In this regard, the phase comparing and detecting circuits $C_1$ and $C_2$ are of the same structure as that of the aforementioned phase comparing and detecting circuit C which is adapted to output a voltage corresponding to a phase difference between two input signals.

After the output signals of the frequency converting circuits $F_1$, $F_2$ and $F_3$ have been frequency converted to be in-phase signals, they are then supplied to an adding circuit $S_1$ 50 wherein these signals are synthesized into a tripled output signal.

Each of the phase shifters $P_1$ and $P_2$ is preferably variable in the amount of phase shift within a range between 0 degrees and 360 degrees in the analog manner. However, the present invention may utilize a digital phase shifter. In the latter case, the step (width) of phase shift is preferably equal to or smaller than 45 degrees. Although the aforementioned embodiment has been described as to the input 1 used as a reference input, any one of the other inputs (e.g. input 2 or 3) may be used as a reference.

Second Example of Phase Correcting and Synthesizing Circuit

Figure 6:
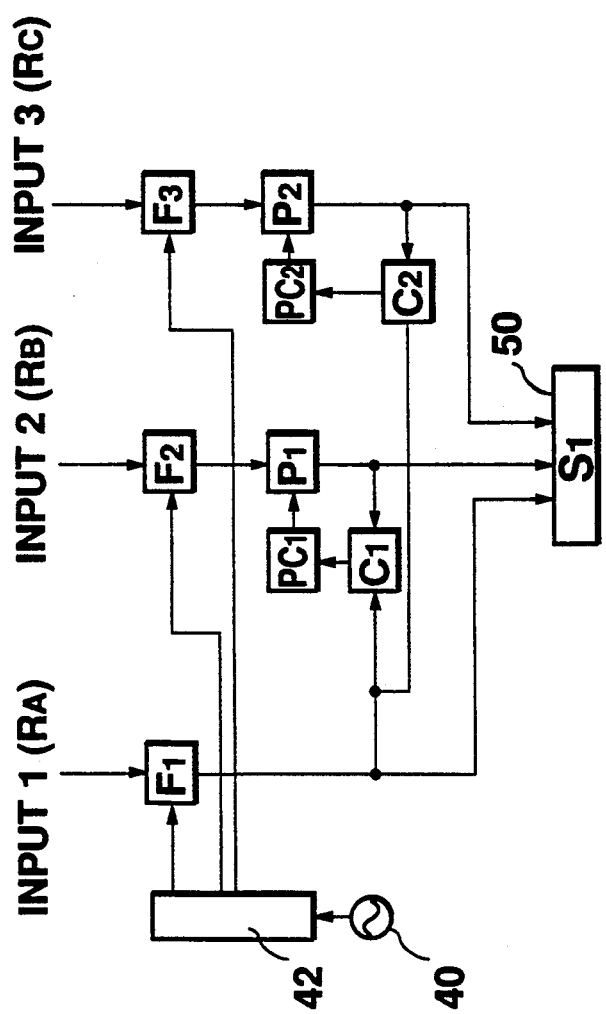
FIG. 6 is a block diagram of another phase correcting and synthesizing circuit.

Referring next to FIG. 6, there is shown the second example of a phase correcting and synthesizing circuit PS which is different from the first example in that the phase shifters $P_1$ and $P_2$ are disposed differently. More particularly, a signal having a given frequency which is outputted from the local oscillator 40 and branching circuit 42 is directly inputted to the respective frequency converting circuits $F_1$, $F_2$ and $F_3$. Thus, the output signals from the frequency converting circuits $F_1$, $F_2$ and $F_3$ are changed in frequency, but not converted in phase.

Phase shifters $P_1$ and $P_2$ are disposed in the output lines from the frequency converting circuits $F_2$ and $F_3$, respectively. Three signals inputted to the adder S are made in-phase, depending on the amount of phase shift in the phase shifters $P_1$ and $P_2$. The feedback control of the output signals from the phase shifters $P_1$ and $P_2$ by using the output signal of the frequency converting circuit $F_1$ as a reference signal is similar to that of the first example. The second example requires a smaller number of in-loop circuits than the first example and thus can decrease the delay in the loop. Therefore, the second example can increase the loop gain more than the first example. One of these embodiments will be selected depending on various conditions such as the mode of application, environment or the like.

After the reception signals have been converted into signals having lower frequencies, they will be adjusted in phase and then fed to the adding circuit $S_1$ 50.

The second example does not necessarily require the frequency converting circuits $F_1 - F_3$ and local oscillating circuit 40. The signals $R_A$, $R_B$ and $R_C$ may be similarly corrected to have the same phase by directly inputting them to the respective phase shifters.

Other Embodiments

Figure 7:
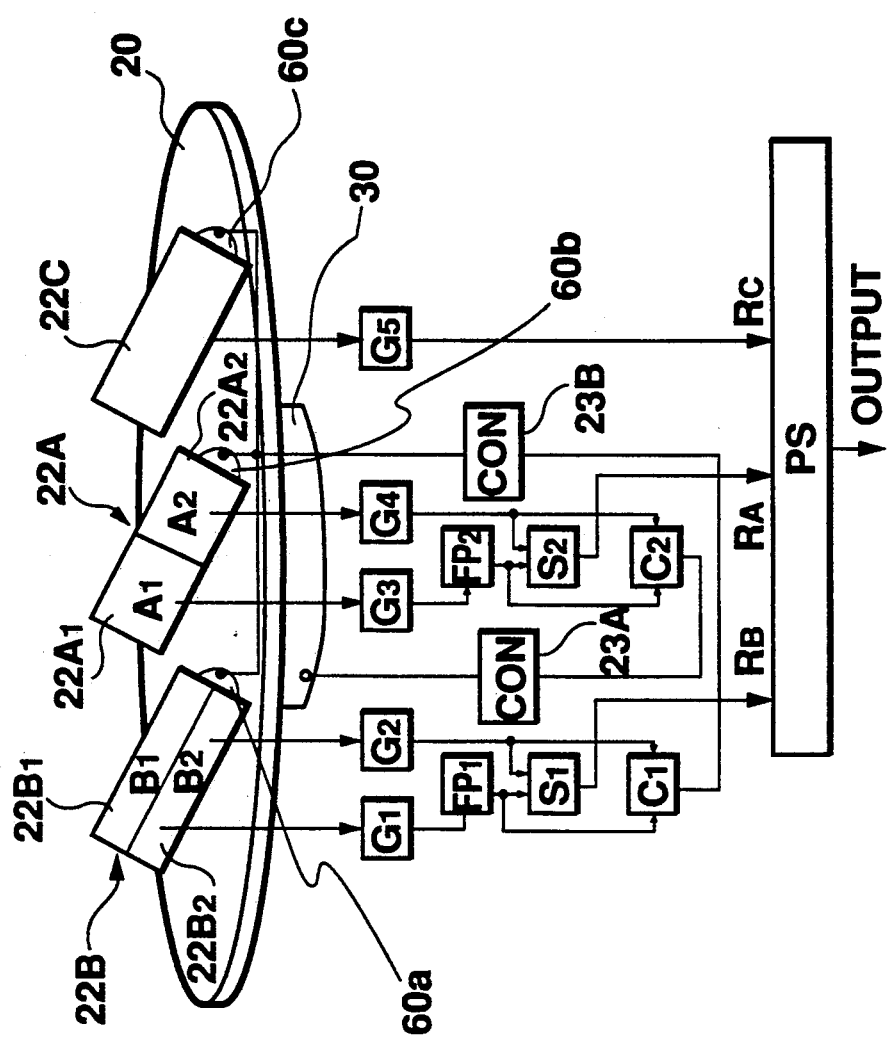
FIG. 7 is a schematic diagram of another arrangement of a tracking antenna system constructed in accordance with the present invention.

Another embodiment of a tracking antenna system constructed in accordance with the present invention will be described with reference to FIG. 7.

This embodiment is characterized by further drive and control for shifting the sub-arrays in the direction of elevation.

One of two remaining sub-arrays (herein, 22B) other than the laterally divided sub-array 22A is vertically divided into two sub-array sections $22B_1$ and $22B_2$. The sub-array 22B is located at the forwardmost portion on the turntable 20. Each of the sub-arrays 22A-22C can be rotated in the direction of elevation by an elevation drive device 60a, 60b or 60c. Outputs from the sub-array sections $22B_1$ and $22B_2$ are inputted to the amplifiers G and a phase comparing and detecting circuit C, as in the sub-arrays $22A_1$ and $22A_2$. The phase comparing and detecting circuit C detects a phase difference between the input signals. The output of this phase comparing and detecting circuit C is then fed to an elevation drive control section 23B which in turn generates an elevation drive signal inputted to the respective elevation drive devices 60a–60c. Thus, the elevation drive devices 60a–60c will be actuated depending on the output of the phase comparing and detecting circuit C. As a result, all the sub-arrays 22A, 22B and 22C can be rotated to have the same elevation angle in completely the same manner.

A phase difference between the sub-array sections $22B_1$ and $22B_2$ corresponds to the deviation of angle in the sub-array 22B relative to the direction of the satellite. If the elevation drive devices 60a–60c are so controlled that the phase difference becomes zero depending on the output of the phase comparing and detecting circuit C, the sub-arrays 22A-22C can be properly oriented to the satellite at all times. Each of the elevation drive devices 60a-60c may include a servomotor, as in the azimuth drive device 30. In such a case, the elevation angle in the respective sub-arrays 22A-22c will be determined depending on the elevation drive signal supplied from the elevation drive control section 23B to the servomotor.

This embodiment can properly orient the sub-arrays 22A-22C to the satellite, based on the outputs of the vertically divided sub-array sections $22B_1$ and $22B_2$. The reception signals obtained by the sub-array sections $22B_1$ and $22B_2$ are adjusted to be in phase by the phase adjusting circuit FP and summed by the adding circuit S to form a signal which is in turn fed to the phase correcting and synthesizing circuit PS. The output of the phase correcting and synthesizing circuit PS is therefore a sum of the reception signals from all the antenna elements 24 in the three sub-arrays 22A-22C and so can provide a sufficient output.

The signal processing and azimuth controlling steps of the sub-array 22A are exactly the same as those of the aforementioned embodiment. The arrangement of the phase correcting and synthesizing circuit PS also is similar to those as shown in FIGS. 5 and 6.

Since this embodiment can control not only the azimuth angle but also the elevation angle, the antenna system can more accurately track the satellite to maintain sufficient output.

The Other Arrangements

The sub-arrays 22 may be non-equidistantly arranged. Usually, the spacing between the sub-arrays 22 is set as small as possible in order to reduce the entire antenna system in size. If the spacing is too small, however, one sub-array may be shaded by another sub-array. As seen from FIG. 8, it is preferable that the minimum spacing is set to be LS depending on the height of the sub-array if it is assumed that the direction of satellite is INC.

Figure 8:
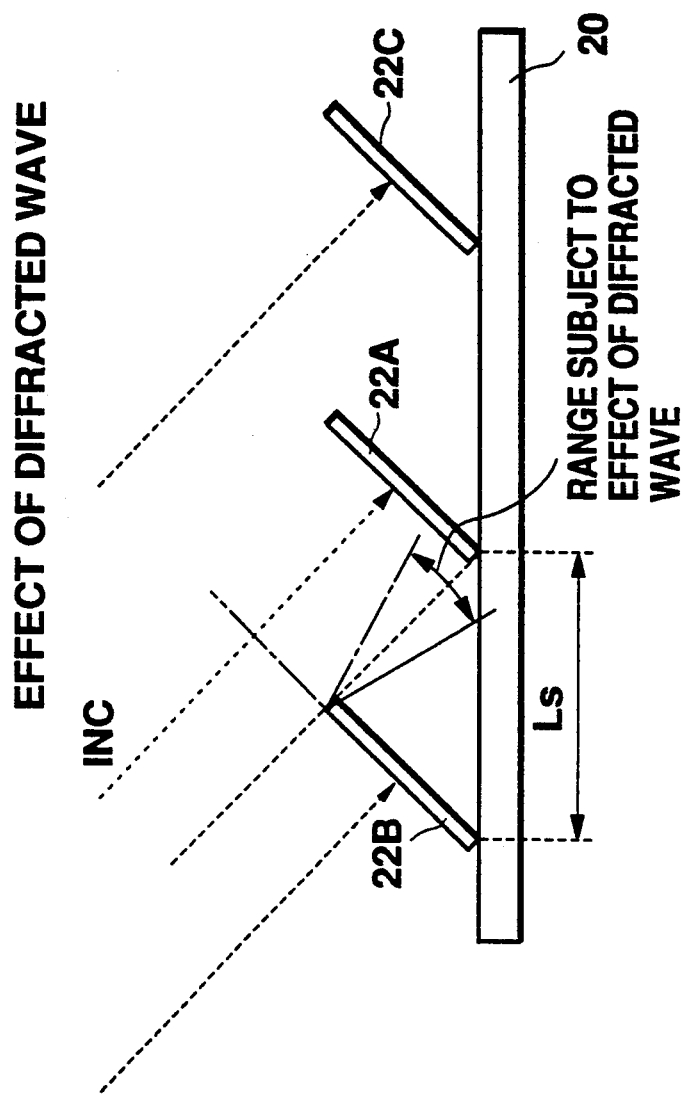
FIG. 8 is a view illustrating the effect of diffracted waves.

In general, diffracted waves are created at the top metal portions of the sub-arrays 22. As radio waves pass near the top ends of the sub-arrays 22, they will spread to some extent due to the phenomenon of diffraction. As a result, the succeeding sub-array will receive diffracted waves at a region as shown in FIG. 8.

If the vertically divided sub-array 22B is placed behind any other sub-array 22, the lower sub-array section 22B$_2$ will receive a sum of diffracted waves with the radio waves incident thereon. This results in errors in the phase comparing and detecting step with respect to the reception signals in the upper and lower sub-array sections 22B$_1$ and 22B$_2$.

For this reason, the vertically divided sub-array 22B is placed at the forwardmost position on the turntable. Thus, the sub-array 22B can receive proper reception signals without being affected by the diffracted waves, so that the control of elevation can be performed more accurately.

However, this is not true of the laterally divided sub-array 22A which can be located behind any other sub-array.

An Example of the Phase Comparing and Detecting Circuit C

The phase comparing and detecting circuit is generally in the form of a multiplying circuit. If the frequency of the reception signals is high (which is equal to 12 GHz for the broadcasting satellite), however, it is difficult to make a suitable multiplier. If the sensitivity of reception is low, the output of the multiplier will contain more noise. This can be overcome by utilizing the following arrangement of the phase comparing and detecting circuit constructed in accordance with the present invention. It is to be understood that such an arrangement may be applied to all the aforementioned embodiments.

Figure 9:
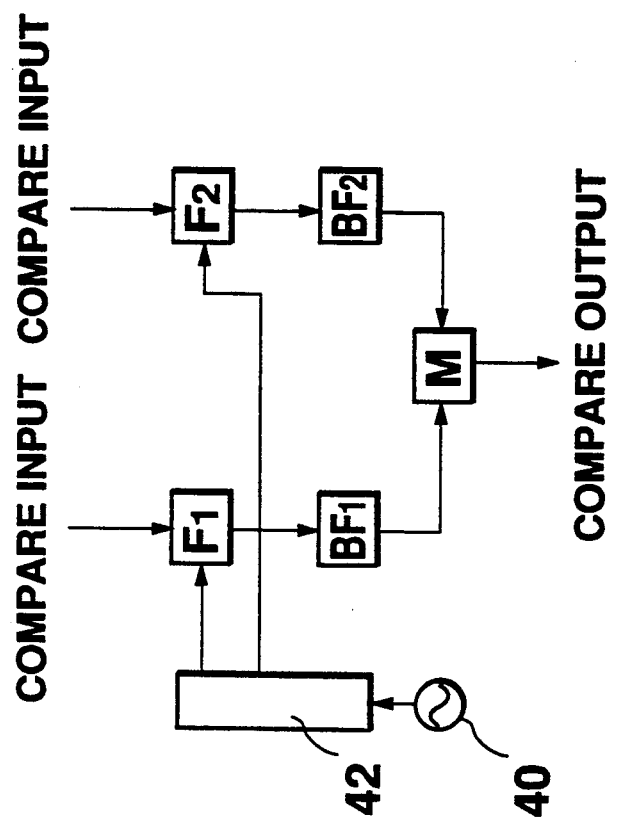
FIG. 9 is a block diagram of a phase- comparing-and-detecting circuit.

Referring to FIG. 9, the reception signals are converted into low-frequency signals at the frequency converting circuits F$_1$ and F$_2$ which are supplied with the output signals of the local oscillating circuit 40 through the branching circuit 42. The low-frequency signals subjected to the conversion at the frequency converting circuits F$_1$ and F$_2$ are limited to a band width smaller than that possessed inherently by the reception signals at band-pass filters BF$_1$ and BF$_2$.

Figure 10:
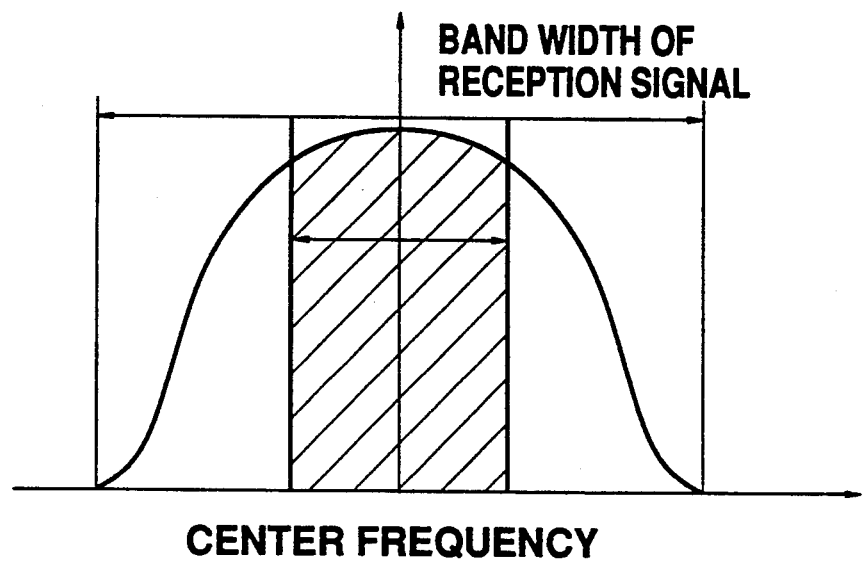
FIG. 10 is a graph illustrating the spectrum of reception power in a reception signal.
Figure 11:
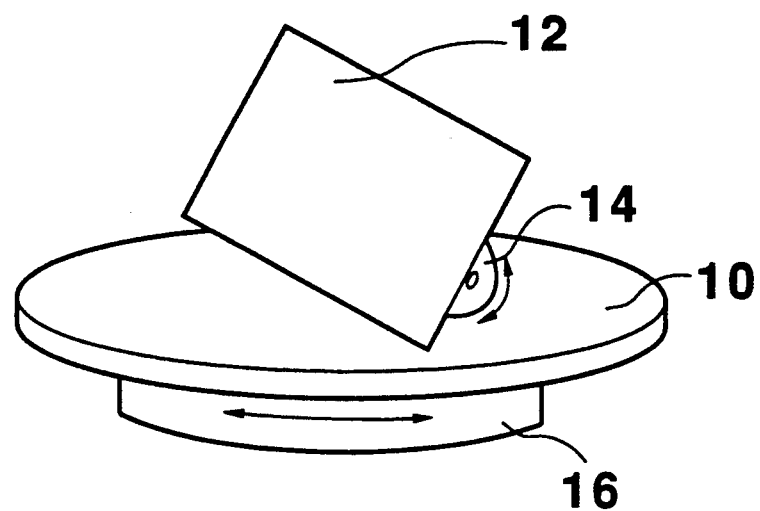
FIG. 11 is a schematic diagram of a tracking antenna system constructed in accordance with the prior art.

As shown in FIG. 10, the normal reception signals have a particular band width. This will be limited to only the central portion, at which the electric power of the reception signals are most concentrated, by means of the band-pass filters BF$_1$ and BF$_2$. For example, the band width of the band-pass filter BF is set to be 50% smaller than the band width of the reception signals.

In order to perform the demodulation of the reception signals, it is impossible to limit the band width to a narrower level than the necessary level. However, the phase-comparing-and-detecting circuit C requires only the detection of the phase difference between two reception signals and does not require the passage of the entire band. Thus, the above limitation of band width will raise no problem. By limiting the band width to 50%, the signal to noise ratio (S/N ratio) can be improved twofold.

It has been found that on reception of the satellite broadcast, the band width in each of the band-pass filters BF$_1$ and BF$_2$ may be equal to or larger than 20% of the necessary band width.

As will be apparent from the foregoing, the tracking antenna system of the present invention is of a simplified structure which can accurately detect the direction of the satellite from the signals from the antenna itself by detecting a phase difference between the outputs of the laterally divided antenna sub-array. Since a plurality of such antenna sub-arrays are provided in the tracking antenna system, the entire system can be reduced in height. Furthermore, the present invention provides the vertically divided sub-array which can detect a phase difference between the reception signals from the upper and lower sub-array sections. By controlling the elevation drive device such that the phase difference will be zero at all times, the tracking antenna system of the present invention can be always oriented towards the satellite with an increased precision.

We claim:

1. A tracking antenna system mounted on a vehicle and controllable to be directed towards a satellite, comprising:
   a plurality of sub-arrays each including a plurality of antenna elements arranged in a plane, each sub-array for outputting a reception signal;
   a laterally divided sub-array included in said sub-arrays and comprising at least two laterally divided groups of antenna elements, each group outputting a separate reception signal;
   a turntable including a surface on which said sub-arrays including said laterally divided sub-array are disposed such that the planes of said sub-arrays are parallel to each other;
   a phase comparing and detecting circuit for receiving reception signals from the respective groups of antenna elements in said laterally divided sub-array to detect a phase difference therebetween and outputting a signal based on the detected phase difference;
   rotary drive means responsive to the output signal of said phase comparing and detecting circuit to rotatably drive said turntable;
   an adding circuit for receiving the reception signals from the respective groups of antenna elements in said laterally divided sub-array and summing the reception signals into an output signal; and
   a phase correcting and synthesizing circuit, comprising:
   a plurality of frequency converting circuits for receiving the reception signals from the respective sub-arrays and for mixing the reception signals with a reference signal supplied from a local oscillator to convert the frequency of each reception signal into another frequency;
   a plurality of phase difference detecting circuits for detecting phase differences between one of the frequency converted reception signals and other frequency converted reception signals; and
   a phase shifter for shifting a phase of the reference signal supplied to at least one of the frequency converting circuits depending on a phase difference detected by one of said phase difference detecting circuits so that the frequency converting circuits output reception signals having a same phase.

2. A tracking antenna system as defined in claim 1, wherein:
   each of said sub-arrays has a transversely elongated rectangular configuration; and
   the number of antenna elements in the longitudinal direction of each of said sub-arrays is smaller than that in the transverse direction.

3. A tracking antenna system as defined in claim 2, wherein:
   each of the groups in said laterally divided sub-array has the same or nearly equal number of antenna elements.

4. A tracking antenna system as defined in claim 1, further comprising:
- a vertically divided sub-array included in said sub-arrays, said vertically divided sub-array comprising an upper group and a lower group of antenna elements, each of said groups for outputting a separate reception signal;
- elevation drive means for rotatably driving said sub-arrays including said vertically divided sub-array in a direction of elevation on said turntable;
- an elevation drive phase comparing and detecting circuit for receiving the reception signals from the respective groups of antenna elements in said vertically divided sub-array to detect a phase difference therebetween; and
- elevation drive control means responsive to a detection value from said elevation drive phase comparing and detecting circuit to control said elevation drive means.

5. A tracking antenna system as defined in claim 4 wherein said vertically divided sub-array is disposed on said turntable at a forwardmost position thereof.

6. A tracking antenna system mounted on a vehicle and controllable to be directed towards a satellite, comprising:
- a plurality of sub-arrays each including a plurality of antenna elements arranged in a plane, each sub-array for outputting a reception signal;
- a laterally divided sub-array included in said sub-arrays and comprising at least two laterally divided groups of antenna elements, each group outputting a separate reception signal;
- a turntable including a surface on which said sub-arrays including said laterally divided sub-array are disposed such that the planes of said sub-arrays are parallel to each other;
- a phase comparing and detecting circuit for receiving reception signals from the respective groups of antenna elements in said laterally divided sub-array to detect a phase difference therebetween and outputting a signal based on the detected phase difference;
- rotary drive means responsive to the output signal of said phase comparing and detecting circuit to rotatably drive said turntable;
- an adding circuit for receiving the reception signals from the respective groups of antenna elements in said laterally divided sub-array and summing the reception signals into an output signal; and
- a phase correcting and synthesizing circuit comprising:
- a plurality of frequency converting circuits for receiving the reception signals from the respective sub-arrays and for mixing the reception signals with a reference signal supplied from an oscillator to convert the frequency of each reception signal into another frequency;
- a plurality of phase difference detecting circuits for detecting phase differences between one of the frequency converted reception signals and other frequency converted reception signals; and
- a phase shifter connected between at least one of the frequency converting circuits and a corresponding phase difference detecting circuit, said phase shifter for changing a phase of a reception signal output by said at least one frequency converting circuit supplied to said corresponding phase difference detecting circuit, depending on one of the phase differences detected by said corresponding phase difference detecting circuit.

7. A tracking antenna system as defined in claim 6, wherein said phase comparing and detecting circuit further comprises:
- second frequency converting circuits for converting the frequencies of the frequency converted reception signals.

8. A tracking antenna system as defined in claim 7, wherein said phase comparing and detecting circuit comprises band-pass filters for filtering the second frequency converted reception signals, outputs from the band-pass filter connected to a mixer for comparing phases of the frequency converted reception signals passed through the respective band-pass filters.

9. A tracking antenna system mounted on a vehicle and controllable to be directed towards a satellite, comprising:
- a plurality of sub-arrays each including a plurality of antenna elements arranged in a plane, each sub-array for outputting a reception signal;
- a vertically divided sub-array included in said sub-arrays, said vertically divided sub-array comprising at least an upper group and a lower group of antenna elements, each group of antenna elements for outputting a separate reception signal;
- a turntable having a surface on which said sub-arrays including said vertically divided sub-array are arranged, surfaces of the antenna elements in the respective sub-arrays being parallel to each other;
- elevation drive means for rotatably driving said sub-arrays including said vertically divided sub-array on said turntable;
- an elevation drive phase comparing and detecting circuit for receiving the reception signals from the respective groups of antenna elements in said vertically divided sub-array to detect a phase difference therebetween;
- elevation drive control means responsive to the detection value from said elevation drive phase comparing and detecting circuit to drive said elevation drive means;
- an adding circuit for receiving the reception signals from the respective groups of antenna elements in said divided sub-array; and
- a phase correcting and synthesizing circuit for receiving, correcting the phase of, and synthesizing into a composite signal the reception signals from said sub-arrays including said divided sub-array.

* * * * *